United States Patent
Yang et al.

(10) Patent No.: US 11,489,205 B2
(45) Date of Patent: Nov. 1, 2022

(54) PRIMARY LITHIUM BATTERY

(71) Applicant: Xiamen University, Fujian (CN)

(72) Inventors: Yong Yang, Fujian (CN); Liangfan Xu, Fujian (CN); Yixiao Li, Fujian (CN); Jun Gao, Fujian (CN); Huajin He, Fujian (CN)

(73) Assignee: XIAMEN UNIVERSITY, Fujian (CN)

( * ) Notice: Subject to any disclaimer, the term of this patent is extended or adjusted under 35 U.S.C. 154(b) by 278 days.

(21) Appl. No.: 16/874,795

(22) Filed: May 15, 2020

(65) Prior Publication Data

US 2020/0287244 A1    Sep. 10, 2020

Related U.S. Application Data

(63) Continuation of application No. PCT/CN2018/096502, filed on Jul. 20, 2018.

(30) Foreign Application Priority Data

Nov. 15, 2017 (CN) .......................... 201711133240.9

(51) Int. Cl.
H01M 10/0569 (2010.01)
H01M 10/0525 (2010.01)
(Continued)

(52) U.S. Cl.
CPC ....... H01M 10/0569 (2013.01); H01M 4/131 (2013.01); H01M 4/134 (2013.01);
(Continued)

(58) Field of Classification Search
None
See application file for complete search history.

(56) References Cited

U.S. PATENT DOCUMENTS

2003/0003367 A1    1/2003 Roh et al.
2010/0129723 A1*   5/2010 Noda .................. H01M 6/162
                                                           429/324
(Continued)

FOREIGN PATENT DOCUMENTS

CN    1647300 A    7/2005
CN    102185156 A   9/2011
(Continued)

OTHER PUBLICATIONS

WO2017047554 English translation. Abe. Wipo. Mar. 23, 2017 (Year: 2017).*
(Continued)

*Primary Examiner* — Christopher P Domone
(74) *Attorney, Agent, or Firm* — Cooper Legal Group LLC

(57) ABSTRACT

The present disclosure discloses a primary lithium battery comprising a reactive solid cathode, a liquid electrolyte, a separator, and a lithium anode. The liquid electrolyte is ionic conductive and is configured to undergo a series coupling reaction after solid phase reaction of the reactive solid cathode and the lithium anode. The liquid electrolyte comprises a solvent and an electrolyte salt, and a concentration of the electrolyte salt in the liquid electrolyte is 0.1-3 mol/L. The solvent comprises a sulfite ester type compound and an organic solvent, and a concentration of the sulfite ester type compound in the organic solvent is 5 wt % to 90 wt %.

12 Claims, 2 Drawing Sheets

(51) Int. Cl.
  *H01M 4/134* (2010.01)
  *H01M 4/131* (2010.01)
  *H01M 4/505* (2010.01)
  *H01M 50/44* (2021.01)
  *H01M 50/431* (2021.01)
  *H01M 4/02* (2006.01)

(52) U.S. Cl.
  CPC ....... *H01M 4/505* (2013.01); *H01M 10/0525* (2013.01); *H01M 50/431* (2021.01); *H01M 50/44* (2021.01); *H01M 2004/021* (2013.01)

(56) References Cited

U.S. PATENT DOCUMENTS

2011/0262796 A1* 10/2011 Shimooka ............. H01M 4/483
                                                       429/231.95
2015/0295241 A1   10/2015 Liang et al.
2017/0275311 A1*  9/2017 Kotou ................... C07F 9/4084

FOREIGN PATENT DOCUMENTS

| | | | |
|---|---|---|---|
| CN | 103985906 | A | 8/2014 |
| CN | 104577201 | A | 4/2015 |
| CN | 105355977 | A | 2/2016 |
| CN | 106099132 | A | 11/2016 |
| CN | 106450365 | A | 2/2017 |
| CN | 107910568 | A | 4/2018 |
| JP | 2008262761 | A | 10/2008 |
| WO | WO2017047554 | * | 3/2017 |

OTHER PUBLICATIONS

Tian Yanyan et al. "Enhanced electrochemical performance of fluorinated carbon nanotube as cathode for Li—O-2 primary batteries", Electrochimica Acta, 2013, 90, 186-193.
International Search Report with English Translation, cited in PCT/CN2018/096502 dated Oct. 11, 2018 6 pages.
Written Opinion with English Translation, cited in PCT/CN2018/096502 dated Oct. 11, 2018 9 pages.

* cited by examiner

PRIMARY LITHIUM BATTERY

RELATED APPLICATIONS

This application is a continuation of and claims priority to International Patent Application PCT/CN2018/096502, filed on Jul. 20, 2018, which claims priority to Chinese Patent Application 201711133240.9, filed on Nov. 15, 2017. International Patent Application PCT/CN2018/096502 and Chinese Patent Application 201711133240.9 are incorporated herein by reference.

FIELD OF THE DISCLOSURE

The present disclosure relates to chemical batteries, and in particular relates to a primary lithium battery.

BACKGROUND OF THE DISCLOSURE

With the development of consumer electronics, electric vehicles, and other electric products, using lithium-ion batteries as a power source has received extensive attention. The energy density of commercial lithium-ion batteries can reach 250 Wh/kg. For some consumer electronics with high energy density requirements, such as used in aviation and aerospace applications, deep sea applications, medical applications, radio frequency identification devices, remote sensing devices, and artificial heart pacemakers, the power source is required to have a high energy density to be able to continuously function for a long time.

Compared with rechargeable lithium-ion batteries, primary batteries, especially lithium primary batteries comprising Li—$MnO_2$, Li—$SO_2$, Li—$SOCl_2$, and Li—$CF_x$ batteries, have a higher specific capacity and energy density. Therefore, these primary batteries can better meet the requirements of these applications, where the theoretical energy density of fluorinated carbon reaches 2180 Wh/kg, which far exceeds the energy density of current commercial lithium-ion batteries.

Although the solid cathode material of fluorinated carbon and other primary batteries has a very high specific energy, the primary batteries will also comprise other inactive components in the assembled battery. Therefore, an assembled primary lithium battery will have a reduced specific energy comprised to the very high specific energy of the solid cathode itself. In the traditional primary lithium battery, an electrolyte plays a major role in conducting lithium-ions. A mass of the electrolyte in the battery is relatively high, which is an important factor affecting the overall specific energy of the assembled battery. Lithium primary batteries do not get recharged, so the electrolyte only needs to remain stable until the discharge of the solid cathode material is complete. Therefore, through reasonable design and selection, some of the solvent/salt components in the electrolyte can act as a liquid cathode after the discharge of the solid cathode material and can provide additional capacity if discharged in a higher voltage range. If the specific energy of the electrolyte is increased by providing additional capacity, the energy density of the assembled primary lithium battery will be greatly improved.

Tian Yanyan et al. ("Enhanced electrochemical performance of fluorinated carbon nanotube as cathode for Li—O-2 primary batteries", *Electrochimica Acta*, 2013, 90, 186-193) once reported an electrochemical reaction system for the combination of carbon fluoride and an oxygen electrode. At a current density of 1 A/g, the discharge capacity of the cathode material can be as high as 676 mAh/g, which is much higher than the capacity of 188 mAh/g for pure carbon fluoride materials. US 20150295241 (A1) disclosed that β-Li3PS4, applied in lithium fluorinated carbon batteries, can provide additional discharge capacity. However, the proposed solution uses an all-solid electrolyte, which is affected by the speed of ion diffusion. It is very difficult to achieve full utilization of active materials. CN104577201A disclosed a sulfur group-containing compound as a liquid electrolyte of a primary lithium battery, but this proposed solution only suggests that it can improve the compatibility of the liquid electrolyte and carbon fluoride. At present, there are no patents and literature reports on primary batteries using solid-liquid phase series coupling reaction mode and their cell structures and formulations.

BRIEF SUMMARY OF THE DISCLOSURE

The present disclosure provides a primary lithium battery intended to solve deficiencies of the existing techniques.

A working principle of a primary lithium battery of the present disclosure can be divided into two steps: when a voltage of the primary lithium battery is in a range of 3.2 V-2.4 V, an active material of a reactive solid cathode will first participate in a discharge reaction. At this time, a liquid electrolyte mainly conducts lithium-ions and does not participate in the discharge reaction. As the discharge progresses, the active material of the solid cathode is gradually depleted. When the voltage of the primary lithium battery drops below 2.4 V, a sulfite compound in the liquid electrolyte can participate in the discharge reaction by acting as a liquid electrode.

The discharge reaction of the sulfite compound in the present disclosure can be expressed by the following equation:

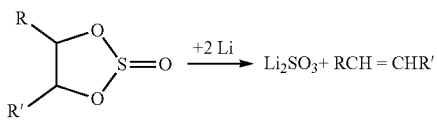

In order to solve the aforementioned technical problems, a technical solution of the present disclosure is as follows.

A primary lithium battery based on a solid-liquid phase series coupling reaction mode comprises a reactive solid cathode, a liquid electrolyte, a separator, and a lithium anode. The liquid electrolyte is ionic conductive and is configured to undergo a series coupling reaction after solid phase reaction of the reactive solid cathode and the lithium anode. The liquid electrolyte comprises a solvent and an electrolyte salt. A concentration of the electrolyte salt in the liquid electrolyte is 0.1-3 mol/L. The solvent comprises a sulfite ester type compound and an organic solvent, and a concentration of the sulfite ester type compound in the organic solvent is 5 wt %-90 wt %. A structural formula of the sulfite ester type compound is as follows:

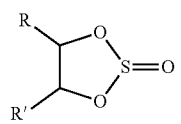

R is selected from hydrogen, fluorine, chlorine, bromine, iodine, an alkyl group comprising a general formula of —$C_xH_{2x+1}$, or an olefin group comprising a general formula of —CH=$C_xH_{2x}$, wherein x is an integer selected from 1-5. R' is selected from hydrogen, fluorine, chlorine, bromine, iodine, an alkyl group comprising a general formula of —$C_xH_{2x+1}$, or an olefin group comprising a general formula of —CH=$C_xH_{2x}$, wherein x is an integer selected from 1-5.

In a preferred embodiment, the organic solvent is at least one of ethylene carbonate, propylene carbonate, dimethyl carbonate, diethyl carbonate, methyl ethyl carbonate, methyl propyl carbonate, butylene carbonate, ethylene glycol dimethyl ether, sulfolane, or dimethyl sulfoxide.

In a preferred embodiment, the electrolyte salt is at least one of lithium hexafluorophosphate, lithium tetrafluoroborate, lithium bis (oxalato) borate, lithium difluoro (oxalato) borate, lithium hexafluoroarsenate (V), or lithium perchlorate.

In a preferred embodiment, a material of the reactive solid cathode is selected from metal, non-metal fluoride, or metal oxide.

In a preferred embodiment, the non-metal fluoride comprises carbon fluoride, and the metal oxide comprises manganese dioxide.

In a preferred embodiment, a material of the lithium anode is metallic lithium or an alloy of metallic lithium.

In a preferred embodiment, the separator is a polymer separator, a composite polymer separator, or an inorganic material separator.

In a preferred embodiment, the polymer separator comprises a polypropylene separator or a polyethylene separator. The composite polymer separator comprises a composite polypropylene separator coated with an inorganic modification layer or an organic modification layer, a composite polyethylene separator coated with an inorganic modification layer or an organic modification layer, a composite polypropylene separator uncoated, or a composite polyethylene separator uncoated. The inorganic material separator comprises a glass fiber separator.

The beneficial effects of the present disclosure are: the present disclosure uses sulfite compounds as a component of the liquid electrolyte in a primary lithium battery. Since a reduction potential of sulfite compounds is lower than that of carbon fluoride and manganese dioxide, sulfite compounds can be used as a liquid electrode for an electrochemical reduction reaction after completion of the traditional solid-state discharge to provide considerable additional capacity, effectively reducing a mass ratio of inactive components of the primary lithium battery. Therefore, a primary lithium battery having high specific energy is achieved.

DETAILED DESCRIPTION OF THE EMBODIMENTS

The present disclosure will be further described below with the combination of the accompanying drawings and the embodiments.

In some embodiments, a liquid electrolyte of ethylene sulphide (ES) with a mass percentage (5%-90%) is prepared. The liquid electrolyte is a mixed solution comprising an electrolyte salt, an organic solvent, and the ES. A concentration of the electrolyte salt is 0.1-3 mol/L. The organic solvent is at least one of ethylene carbonate (EC), propylene carbonate (PC), dimethyl carbonate (DMC), diethyl carbonate (DEC), methyl ethyl carbonate (EMC), butylene carbonate, ethylene glycol dimethyl ether (DME), sulfolane, or dimethyl sulfoxide. The electrolyte salt is at least one of lithium tetrafluoroborate ($LiBF_4$), lithium hexafluorophosphate ($LiPF_6$), lithium hexafluoroarsenate (V) ($LiAsF_6$), lithium perchlorate ($LiClO_4$), lithium bis (oxalato) borate (LiBOB), or lithium difluoro (oxalato) borate (LiODFB).

Embodiment 1

Preparing $LiPF_6$+EC+EMC+ES (x %) (e.g., solution electrolyte) comprising ES with different mass percentages of 1M (1 mol/L) as an electrolyte in a glove box filled with argon gas at room temperature (e.g., 25° C.-50° C.), in which EC:EMC=3:7 (mass ratio). The electrolyte is mixed well.

Comparative Example

Preparing $LiPF_6$+EC+EMC without ES of 1M (1 mol/L) as an electrolyte in a glove box filled with argon gas at the room temperature, in which EC:EMC=3:7 (mass ratio). The electrolyte is mixed well.

Embodiment 2

Figure 1:
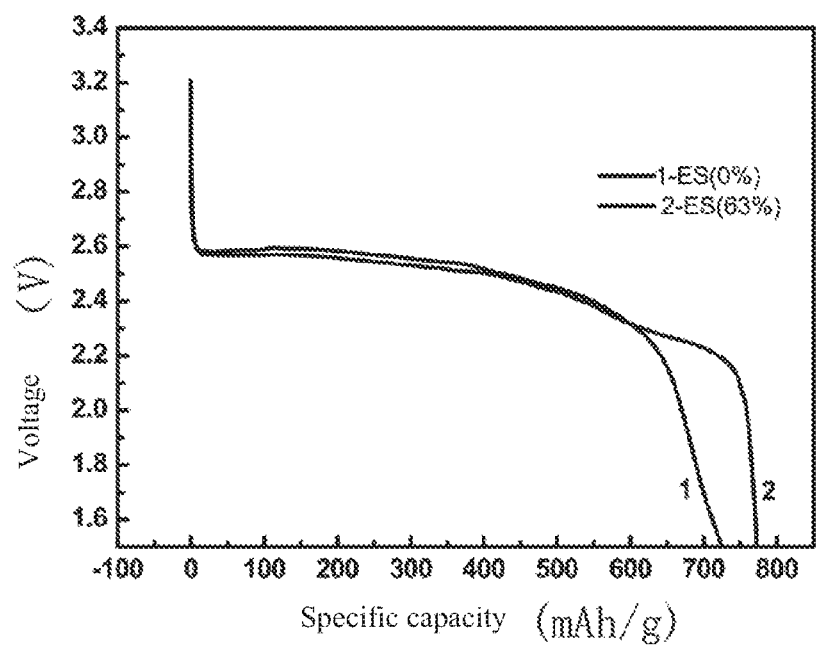
FIG. 1 illustrates a comparative diagram of discharge curves of a lithium-graphite fluoride battery in Embodiment 2 of the present disclosure using a first electrolyte comprising ethylene sulphide (ES) and a second electrolyte not comprising ES, in which a current density is 10 mA/g.

Preparing a Lithium-Graphite Fluoride Battery:

Homogenizing a cathode material of graphite fluoride, a conductive agent of acetylene black, and a binder of polyvinylidene fluoride (PVDF) with a ratio of 85:5:10 (mass ratio) at room temperature using a solvent N-methyl-2-pyrrolidone (NMP) to obtain a mixture. Evenly coating the mixture on a copper foam, drying in a vacuum drying oven at 80° C., and pressing into a shape to obtain an electrode of graphite fluoride. In FIG. 1, a first curve 1 illustrates a discharge curve of the graphite fluoride when the electrolyte does not comprise ES, and a second curve 2 illustrates a discharge curve of the graphite fluoride when the electrolyte comprises ES with a mass percentage of 63%. Compared with the electrolyte that does not comprise ES, a specific capacity and a specific energy of a graphite fluoride-ES composite battery system (e.g., in which the electrolyte comprises ES) were respectively increased by 6.5% and 6.7%.

Embodiment 3

Figure 2:
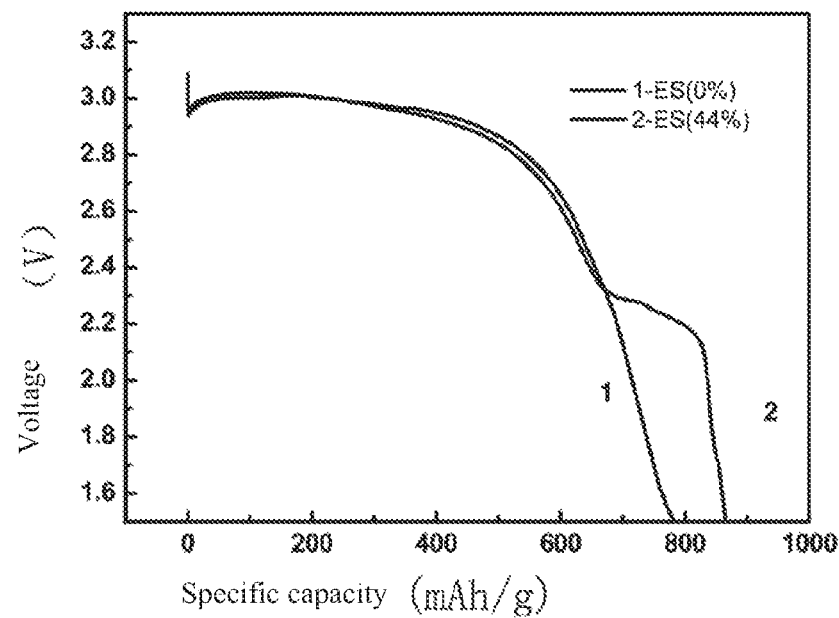
FIG. 2 illustrates a comparative diagram of discharge curves of a lithium-graphene fluoride battery in Embodiment 3 of the present disclosure using a first electrolyte comprising ES and a second electrolyte not comprising ES, in which a current density is 10 mA/g.

Preparing a Lithium-Graphene Fluoride Battery:

Homogenizing a cathode material of graphene fluoride, a conductive agent of acetylene black, and a binder of polyvinylidene fluoride (PVDF) with a ratio of 85:5:10 (mass ratio) at room temperature using a solvent N-methyl-2- pyrrolidone (NMP) to obtain a mixture. Evenly coating the mixture on a copper foam, drying in a vacuum drying oven at 80° C., and pressing into a shape to obtain an electrode of graphene fluoride. In FIG. 2, a first curve 1 illustrates a discharge curve of the graphene fluoride when the electrolyte does not comprise ES, and a second curve 2 illustrates a discharge curve of the graphene fluoride when the electrolyte comprises ES with a mass percentage of 44%. Compared with the electrolyte that does not comprise ES, a specific capacity and a specific energy of a graphene fluoride-ES composite battery system (e.g., in which the electrolyte comprises ES) were respectively increased by 9.9% and 8.5%.

Embodiment 4

Figure 3:
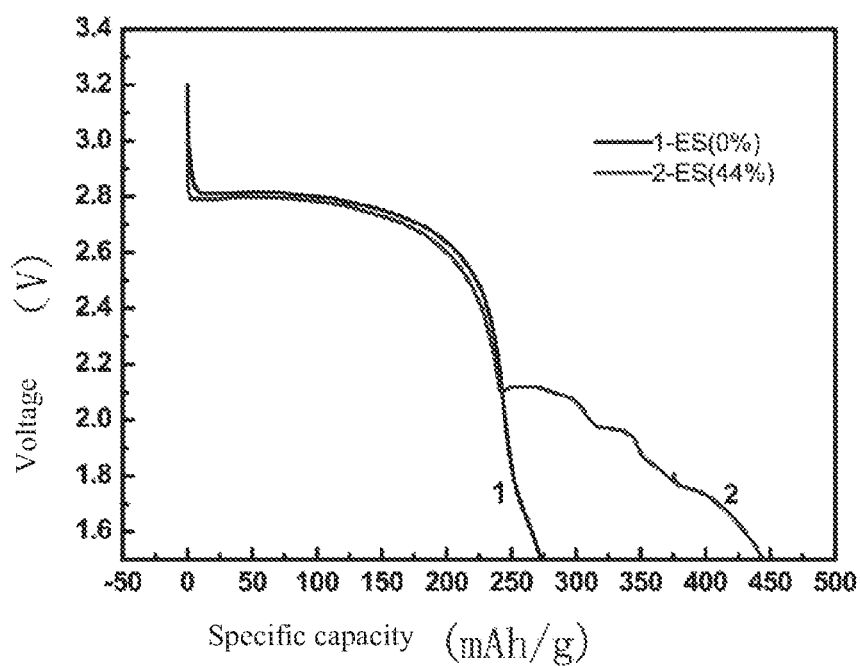
FIG. 3 illustrates a comparative diagram of discharge curves of a lithium manganese dioxide battery in Embodiment 4 of the present disclosure using a first electrolyte comprising ES and a second electrolyte not comprising ES, in which a current density is 10 mA/g.

Preparing a Lithium-Manganese Dioxide Battery:

Homogenizing a cathode material of manganese dioxide, a conductive agent of acetylene black, and a binder of polyvinylidene fluoride (PVDF) with a ratio of 80:10:10 (mass ratio) at room temperature using a solvent N-methyl-2-pyrrolidone (NMP) to obtain a mixture. Evenly coating the mixture on an aluminum foil, drying in a vacuum drying oven at 80° C., and pressing into a shape to obtain an electrode of manganese dioxide. In FIG. 3, a first curve 1 illustrates a discharge curve of the manganese dioxide when the electrolyte does not comprise ES, and a second curve 2 illustrates a discharge curve of the manganese dioxide when the electrolyte comprises ES with a mass percentage of 44%. Compared with the electrolyte that does not comprise ES, a specific capacity and a specific energy of a manganese dioxide-ES composite battery system (e.g., in which the electrolyte comprises ES) were respectively increased by 62.6% and 45.2%.

Embodiment 5

Using the electrodes prepared in Embodiments 2-4 as a cathode, metallic lithium as an anode, Celgard® 2400 as a separator, and $LiPF_6$+EC+EMC or $LiPF_6$+EC+EMC+ES of 1M (1 mol/L) as the electrolyte to assemble 2025 button batteries. Constant current discharge performance tests using a LAND® battery test system (provided by Wuhan Jinnuo Electronics Co., Ltd.), in which a cut-off voltage is 1.5V, a current density is 10 mA/g, a constant temperature of a test environment is 25° C. are performed. Test results are shown in FIGS. 1-3.

A primary lithium battery based on a solid-liquid phase series coupling reaction mode comprises a reactive solid cathode, a liquid electrolyte, a separator, and a lithium anode. The liquid electrolyte is ionic conductive and is configured to undergo a series coupling reaction after solid phase reaction of an electrode (i.e., the reactive solid cathode) and the lithium anode. The liquid electrolyte comprises a solvent and an electrolyte salt. A concentration of the electrolyte salt in the liquid electrolyte is 0.1-3 mol/L. The solvent comprises a sulfite ester type compound and an organic solvent, and a concentration of the sulfite ester type compound in the organic solvent is 5 wt %-90 wt %. A structural formula of the sulfite ester type compound is as follows:

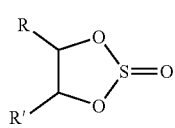

R is selected from hydrogen, fluorine, chlorine, bromine, iodine, an alkyl group comprising a general formula of —$C_xH_{2x+1}$, or an olefin group comprising a general formula of —CH=$C_xH_{2x}$, wherein x is an integer selected from 1-5. R' is selected from hydrogen, fluorine, chlorine, bromine, iodine, an alkyl group comprising a general formula of —$C_xH_{2x+1}$, or an olefin group comprising a general formula of —CH=$C_xH_{2x}$, wherein x is an integer selected from 1-5.

A material of the reactive solid cathode is selected from metal, non-metal fluoride, or metal oxide.

A material of the lithium anode is metallic lithium or an alloy of metallic lithium.

The separator is a polymer separator, a composite polymer separator, or an inorganic material separator. Further, the polymer separator comprises a polypropylene separator or a polyethylene separator. The composite polymer separator comprises a composite polypropylene separator coated with an inorganic modification layer or an organic modification layer, a composite polyethylene separator coated with an inorganic modification layer or an organic modification layer, a composite polypropylene separator uncoated, or a composite polyethylene separator uncoated. The inorganic material separator comprises a glass fiber separator.

It will be apparent to those skilled in the art that various modifications and variation can be made in the present disclosure without departing from the spirit or scope of the invention. Thus, it is intended that the present disclosure cover the modifications and variations of this invention provided they come within the scope of the appended claims and their equivalents.

What is claimed is:

1. A primary lithium battery based on a solid-liquid phase series coupling reaction mode comprising:
    a reactive solid cathode,
    a liquid electrolyte,
    a separator, and
    a lithium anode, wherein:
        the liquid electrolyte is ionic conductive and is configured to undergo a series coupling reaction after solid phase reaction of the reactive solid cathode and the lithium anode,
        the liquid electrolyte comprises a solvent and an electrolyte salt,
        a concentration of the electrolyte salt in the liquid electrolyte is 0.1-3 mol/L,
        the solvent consists of a sulfite ester type compound and an organic solvent,
        the organic solvent is at least one of ethylene carbonate, propylene carbonate, dimethyl carbonate, diethyl carbonate, methyl ethyl carbonate, methyl propyl carbonate, butylene carbonate, ethylene glycol dimethyl ether, sulfolane, or dimethyl sulfoxide,
        a concentration of the sulfite ester type compound in the organic solvent is from 5 wt % to 90 wt %,
        a reduction potential of the sulfite ester type compound is lower than a reduction potential of the reactive solid cathode,
        a structural formula of the sulfite ester type compound is as follows:

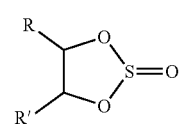

R is selected from hydrogen, fluorine, chlorine, bromine, iodine, an alkyl group comprising a general formula of —$C_xH_{2x+1}$, or an olefin group comprising a general formula of —CH=$C_xH_{2x}$, wherein x is an integer selected from 1 to 5, and R' is selected from hydrogen, fluorine, chlorine, bromine, iodine, an alkyl group comprising a general formula of —$C_xH_{2x+1}$, or an olefin group comprising a general formula of —CH=$C_xH_{2x}$, wherein x is an integer selected from 1 to 5.

2. The primary lithium battery according to claim 1, wherein the electrolyte salt is at least one of lithium hexafluorophosphate, lithium tetrafluoroborate, lithium bis (oxalato) borate, lithium difluoro (oxalato) borate, lithium hexafluoroarsenate (V), or lithium perchlorate.

3. The primary lithium battery according to claim 1, wherein a material of the reactive solid cathode is selected from metal, non-metal fluoride, or metal oxide.

4. The primary lithium battery according to claim 3, wherein:
the non-metal fluoride comprises carbon fluoride, and
the metal oxide comprises manganese dioxide.

5. The primary lithium battery according to claim 1, wherein a material of the lithium anode is metallic lithium or an alloy of metallic lithium.

6. The primary lithium battery according to claim 1, wherein the separator is a polymer separator, a composite polymer separator, or an inorganic material separator.

7. The primary lithium battery according to claim 6, wherein:
the polymer separator comprises a polypropylene separator or a polyethylene separator,
the composite polymer separator comprises a composite polypropylene separator coated with an inorganic modification layer or an organic modification layer, a composite polyethylene separator coated with an inorganic modification layer or an organic modification layer, a composite polypropylene separator uncoated, or a composite polyethylene separator uncoated, and
the inorganic material separator comprises a glass fiber separator.

8. A primary lithium battery, comprising:
a reactive solid cathode,
a liquid electrolyte,
a separator, and
a lithium anode, wherein:
the liquid electrolyte comprises a solvent and an electrolyte salt,
a concentration of the electrolyte salt in the liquid electrolyte is 0.1-3 mol/L,
the solvent consists of a sulfite ester type compound and an organic solvent,
a concentration of the sulfite ester type compound in the organic solvent is 5 wt % to 90 wt %,
the organic solvent is at least one of ethylene carbonate, propylene carbonate, dimethyl carbonate, diethyl carbonate, methyl ethyl carbonate, methyl propyl carbonate, butylene carbonate, ethylene glycol dimethyl ether, sulfolane, or dimethyl sulfoxide,
a reduction potential of the sulfite ester type compound is lower than a reduction potential of the reactive solid cathode,
a structural formula of the sulfite ester type compound is as follows:

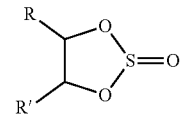

R is selected from hydrogen, fluorine, chlorine, bromine, iodine, an alkyl group comprising a general formula of —$C_xH_{2x+1}$, or an olefin group comprising a general formula of —CH=$C_xH_{2x}$, wherein x is an integer selected from 1 to 5, R' is selected from hydrogen, fluorine, chlorine, bromine, iodine, an alkyl group comprising a general formula of —$C_xH_{2x+1}$, or an olefin group comprising a general formula of —CH=$C_xH_{2x}$, wherein x is an integer selected from 1 to 5, and when a voltage of the primary lithium battery is in a range of 3.2 V-2.4 V, an active material of the reactive solid cathode firsts participates in a discharge reaction, and when the voltage of the primary lithium battery drops below 2.4 V, the sulfite ester type compound in the liquid electrolyte also participates in the discharge reaction by acting as a liquid electrode.

9. The primary lithium battery according to claim 8, wherein:
the electrolyte salt is at least one of lithium hexafluorophosphate, lithium tetrafluoroborate, lithium bis (oxalato) borate, lithium difluoro (oxalato) borate, lithium hexafluoroarsenate (V), or lithium perchlorate.

10. The primary lithium battery according to claim 8, wherein a material of the reactive solid cathode is selected from metal, non-metal fluoride, or metal oxide.

11. The primary lithium battery according to claim 10, wherein:
the non-metal fluoride comprises carbon fluoride, and
the metal oxide comprises manganese dioxide.

12. The primary lithium battery according to claim 8, wherein a material of the lithium anode is metallic lithium or an alloy of metallic lithium.

* * * * *